Fig. 1.

Inventors:
Lawrence D. Beckord,
John G. Fleckenstein,
By Merriam, Smith & Marshall
Attys.

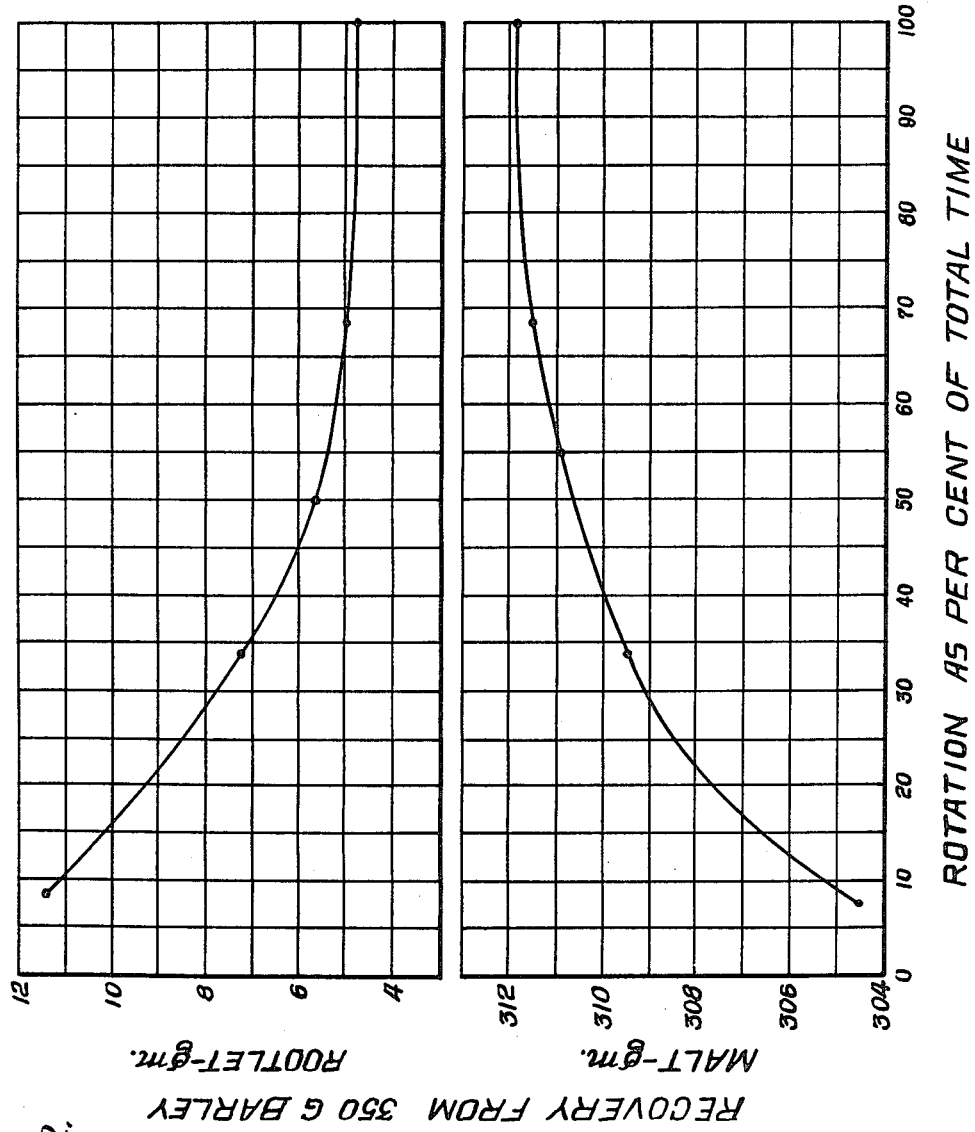

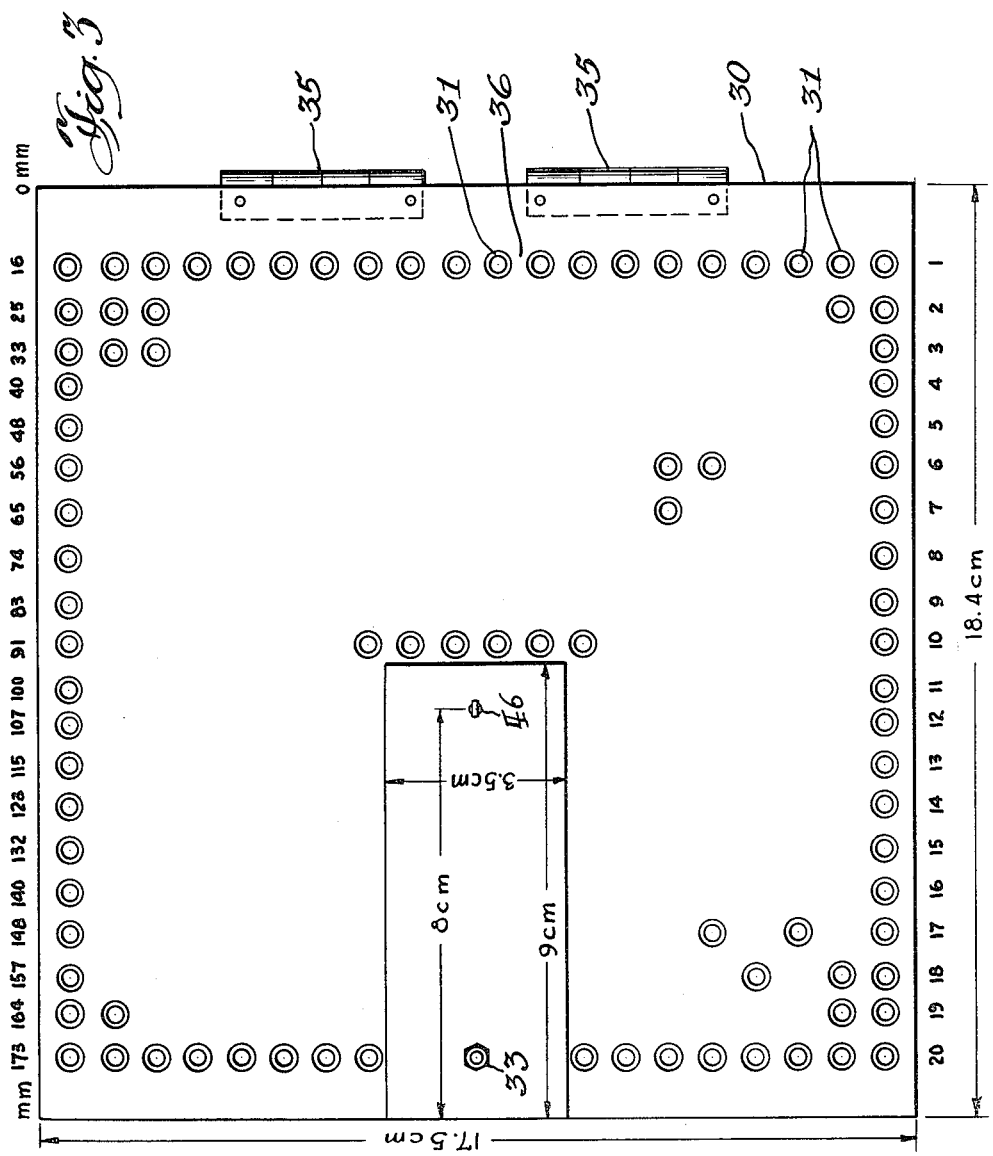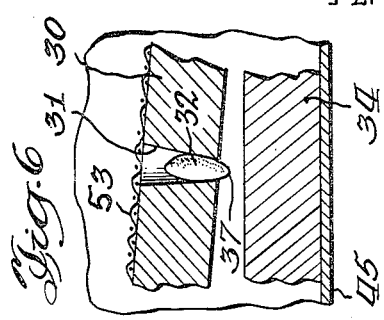

ROOTLET LOSS vs. TOTAL IMPACT
ENERGY APPLIED PER KERNEL
THROUGHOUT GERMINATION

Inventors
Lawrence D. Beckord
John G. Fleckenstein

By Merriam, Smith & Marshall
Attorneys

United States Patent Office 3,174,909
Patented Mar. 23, 1965

3,174,909
MALTING PROCESS UTILIZING PHYSICAL
IMPACT OF KERNELS
Lawrence D. Beckord, Elm Grove, and John G. Fleckenstein, Brookfield, Wis., assignors to Kurth Malting Company, Milwaukee, Wis., a corporation of Wisconsin
Filed Feb. 6, 1964, Ser. No. 343,010
13 Claims. (Cl. 195—69)

This invention relates to malt and processes of producing malt. More particularly, this invention is concerned with a novel malting process which gives improved recoveries, or yields, of malt by the suppression of the growth or formation of rootlets by physical means.

This application is a continuation-in-part of our copending application Serial No. 113,807, filed May 31, 1961, and now abandoned.

In the production of malt from barley, the barley kernels are first steeped by immersing them in water. The steeping continues two to three days, generally in water at a temperature of about 50–65° F. After the moisture content of the barley grains has reached about 35–45%, the steeping is terminated. This point is generally referred to as steep out.

The next step in the production of malt is the germination of the steeped barley kernels. In the germination step the steeped grain is subjected to appropriate conditions of temperature, moisture and air supply for a time sufficient for the interior portion of the barley kernel to be made porous and growth facilitated. This is generally accomplished by spreading the barley in beds of various sizes. Growth starts at the embryo end of the kernel slowly the first day and at an accelerated rate the second day. The barley kernel begins to "chit" at the base of the kernel by showing a white tip. Rootlets then grow outwardly away from the tip. The "acrospire" also starts from the base of the kernel and grows under the hull toward the top end of the kernel. When the acrospire has grown from about ¾ length to the full length of the kernel it is generally indicated that the enzymatic system of the barley has been fully developed.

After germination has proceeded to the desired extent, the green malt is removed from the germinating compartments and conveyed to a kiln where it is dried with heated air. The dried malt is then subsequently cleaned to remove rootlets, loose hulls and broken kernels and then stored.

When the resulting malt is subsequently ground and treated with water at suitable temperatures, it functions to efficiently convert (a) starches to dextrins and sugars, (b) insoluble proteins to soluble proteins during mashing operations in a brewery or distillery, (c) provide a source of desirable taste and aroma which carries through into the finished product, such as beer.

The efficiency of the malting process is evaluated normally by reference to the number of bushels of malt obtained per bushels of grain that are malted. Thus, one bushel of barley will usually yield a maximum of about 1.18 to 1.20 bushels of malt. If the malting operation was completely efficient, a yield of about 1.31 to 1.32 bushels of malt would be obtained per bushel of barley. Although more bushels of malt are obtained than bushels of barley started with, it must be noted that one bushel of barley weighs 48 pounds and one bushel of malt weighs 34 pounds.

There are two major sources of loss in the conversion of barley to malt during the germination step. The first of these is the loss due to respiration during which there is enzymatic conversion of carbohydrate in the barley kernel to carbon dioxide and water. Respiration losses are usually in the range from about 5 to 8%. The other loss due to germination is the rootlet loss due to the formation of rootlet tissue during the germination period which removes material from the barley kernel. Upon drying the malt, the rootlets become very fragile and are removed by abrasion during subsequent handling. The rootlet loss generally amounts to 3 to 5% in conventional malting operations.

It is generally considered that, for malt to be produced having suitable characteristics, the kernels be permitted or induced to grow rootlets without hindrance during the germination period. De Clerck in "A Textbook of Brewing," volume 1, page 156, states, "At the end of this time, the rootlets are generally 1 to 1½ times the length of the corn, and obviously the shorter the rootlets, the lower will be the malting loss, but there may be insufficient modification." This view is supported by Leberle in Part I of "The Technology of Malting," page 204, which when translated from the German indicates "if no rootlets are formed no modification enzymatic production results." These are the views generally accepted in the malting industry and are supported by the commercial methods of preparing malts since the germinating barley is turned or moved only just enough to keep the grain and rootlets from entangling and matting.

It has now been discovered, according to the present invention, that contrary to general concepts of good malting technique, increased recoveries of malt can be obtained by subjecting the steeped barley to considerable repetitious physical impact during the germination period. The amount and extent of the impact to which the germinating barley is subjected should be sufficient to at least significantly, and desirably materially, suppress growth of rootlets but without significantly altering or interfering, by such impact, with other growth and modification processes. Broadly, "impact" and "impingement" as used herein means to apply a shock force of at least 250 gm. cm. of kinetic energy to each kernel during the germination period, within the meaning of the invention, it being understood that such value is calculated based on the process in which impact alone is the means for suppressing rootlet growth and no other means is used to suppress rootlet growth.

In the drawings which constitute a part of this application, and which are described more fully in the examples:

FIGURE 1 illustrates a rotating cradle for experimental malting;

FIGURE 2 is a chart showing increased malt recovery, and reduction in rootlet growth, compared to rotation as percent of total malting time;

FIGURE 3 is a plan view of part of an apparatus for determining kernel impaction;

FIGURE 6 is an enlarged sectional view showing a barley kernel positioned in the apparatus.

Figure 4:
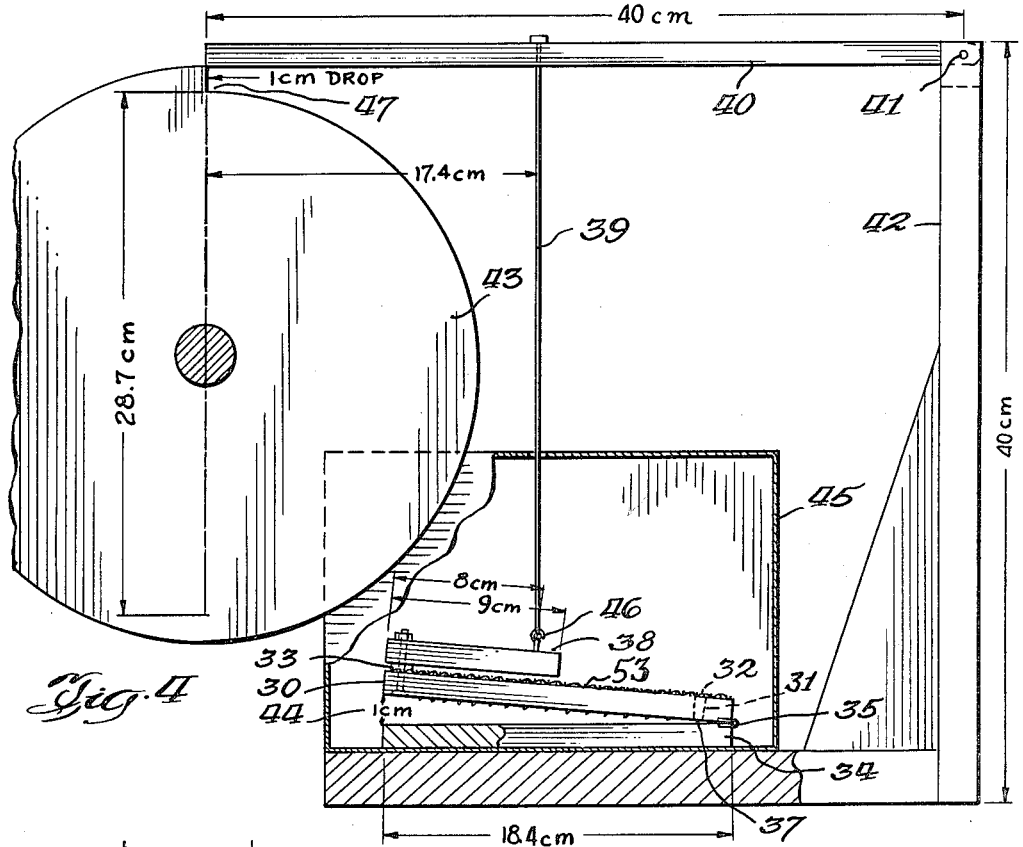
FIGURE 4 is a side elevation of an apparatus for determining kernel impaction, including the part of FIGURE 3.

Although the turning of germinating barley in conventional processes might be considered a means of inducing a mild form of kernel impact or impingement, it has for its primary purpose the prevention of matting of the germinating barley with the secondary purpose of maintaining the porosity of the barley bed so that air can be readily forced through the bed to achieve aeration. The turning operations of the conventional malting processes generally do not extend more than 1% of the total germinating time and, in addition, are so mild as to be insufficient to suppress rootlet growth to any great extent. Indeed, in conventional turning it is desired to avoid interfering materially with rootlet growth.

Impact as used in this process is distinguished from the agitation of normal commercial malting practice in that it is of such vigor and extent over such periods of time that rootlet growth is significantly reduced or, essentially, prevented.

Generally, in practicing the process of this invention, the subjection of the germinating malt or barley to impact or impingement should be for at least 20% of the total germinating time. However, the sequence of physical impacts can continue for the entire germination period without adverse results to the malt obtained. Continuance of the impact process for greater than about 70–80% of the total germination time is usually not warranted because with lesser times of impingement or impact there can be achieved most substantial suppression of rootlet growth. Indeed, if the impact process is sufficiently vigorous and frequent, there is often no need to introduce such impact phase for greater than about 50% of the total germination period. Although it is desirable to at least induce this impingement for a minimum of 20% of the total germination time, it is advisable for economic reasons to increase the period of induced impact to comprise at least 30% of the total germination period.

Subjection of the germinating barley to physical impact can commence in the period anywhere from steep out to about the end of the first day of germination to obtain optimum results. The best results are obtained when such induced impact is commenced immediately after steep out. Commencement of the impact process in the period of the second day of germination also gives improved recoveries of malt by suppression of rootlet growth but the yields are not as high as those obtained when impact begins within the first day of germination. Commencement of the forced kernel impingement after the second day of germination has passed will give some improvement in malt yield but the increased recoveries are not very significant. Subjection to impact during the last, which is usually the fifth, day of germination, is generally unnecessary to obtain the increased recoveries of malt achieved by this process, but may be advantageous in certain instances.

Even though it may be unnecessary to continue the impact process during the full germination period, it is usually advisable to perform it at least intermittently during at least the first four days of germination. The periods of treatment can be of equal or unequal length and they can be equally or unequally spaced during the germination period. In general, part of the total impact time should be used during each day of germination as well as during the day of steep out.

The impact action is advisably applied to inhibit rootlet formation by at least 33⅓%, and desirably by at least 50%, compared to the rootlet formation of malt produced under otherwise identical conditions but with mild agitation used and limited to prevent matting and formation of excessive temperatures in the malting barley kernels without preventing rootlet growth.

By the use of suitable kernel impingement to suppress rootlet growth during the germination period, yields of malt can be increased up to 3 to 4% higher than the yields obtained in some conventional malting processes, with at least a 1% increase being sought.

In any process of malting without, or with only a minimum of, rootlets there are several potential advantages. Compartment malting with continuous impact of the kernels upon each other and upon the walls, floor, and turning device should give a more even growth since the temperature of the malt would be equalized from top to bottom of the box by the continuous movement of the germinating barley. Green malt, without rootlets, occupies considerably less volume than when rootlets are present. There is thus a possibility of increasing the loading of the boxes by up to 25% since formation of the bulky rootlet would be suppressed. Constant movement of the malt will keep it free and much easier to move as there can be no tendency to mat. The malt flows much more freely when the entangling rootlets are not present. This should reduce wear on the malt transfer equipment.

It will readily appear to those skilled in the malting art and acquainted with machinery used in handling it and other grains that subjection of the germinating malt to impingement can be effected in many ways and with widely different mechanisms to attain the results disclosed and taught by this invention. It is only important, whatever means is used, that the energy of impact be of sufficient magnitude and for a sufficient time to reduce rootlet growth to the extent sought, but insufficient to significantly effect adversely the physical structure of the kernels. Thus, the kernel impingement can be effected in beds with vigorous turning or by germinating the barley in rotating drums that can be fixed with mixing or abrading blades.

The following examples are presented to illustrate the invention:

EXAMPLE 1

350 g. samples of dry barley were weighed into one gallon bottles and steeped with appropriate water changes at 55° F. At steep out, the moisture pickup of the sample was adjusted by addition of calculated amounts of water to give the desired malting moisture. The barley samples were germinated for five days at 62–64° F. under controlled conditions with three differing degrees of intensity of kernel impingement using the apparatus as shown in FIGURE 1.

The apparatus as shown in FIGURE 1 comprises a rotating cradle which holds the barley germinating bottles 10 and the humidifier jar 11 supported by pipes 13 and 14 and an identical third pipe not shown. These pipes are connected to supporting plates 15, each of which contains a shaft 16 and 16A which is supported by bearings to facilitate rotation. Pulley 17 is connected to drive means to rotate the cradle. Air enters the mechanism at 18 and after the flow is regulated by suitable valves 19, it is fed to safety bottle 20 and from there through hollow shaft 16A to flexible tube 21 into jar 11. Jar 11 contains glass wool and water to regulate the humidity of the air. The air then flows through tube 22 to manifold pipe 14 which contains a plurality of valves 23 to regulate the air flow by tubes 24 to the germinating bottles 10. Vents 25 permit exhaust air to leave the germinating bottles.

Rotation in such a manner as to cause the kernels to impinge on each other or on other solid surfaces was continuous unless otherwise stated. The least action was obtained by operating the malting apparatus to give a speed of rotation of 0.2 r.p.m. This is the minimum kernel motion commensurate with the preparation of a malt that is not severely matted by entanglement of rootlets. In this and all following examples those malts prepared at 0.2 r.p.m. are control malts. Without this minimum action a usable product is not obtained. A rotation of 1.5 r.p.m. was considered to impart an intermediate impact effect and high impingement was obtained by placing 2 pieces of stainless steel rod one-half inch in diameter by six inches long in bottles that were rotating at 1.5 r.p.m. Other runs were made in which the energy of impingement was decreased during the germination period by the removal of the rods at the desired time and others in which rods were added to the rotating bottles at definite periods after steep out.

After germination, the green malts were weighed and dried on a pilot kiln according to the following schedule: 12 hours at 120° F., 4 hours at 140° F., 6 hours at 155° F., and 2 hours at 175° F. The weight of total dried material was determined and the malts were cleaned to remove rootlets and a small amount of husk. The recovery of clean malt was determined by weighing the rootlets removed and subtracting this figure from the total dry weight.

The recovery of dried material from a series of malts having the same malting moisture was very consistent with variations of less than one gram in total recovery from the 350 gram starting load of barley. The results are reported in Table 1.

TABLE 1

| Rotation Description | Dry Weight Recovered, g. | Rootlets and Clean Out, g. | Clean Malt, g. | Percent Rootlets | Percent Increase |
|---|---|---|---|---|---|
| 0.2 r.p.m. | 308.7 | 13.6 | 295.1 | 4.6 | 19.0 |
| 1.5 r.p.m. | 308.7 | 10.6 | 298.1 | 3.6 | 20.2 |
| 1.5 r.p.m.—rods at steep out | 308.7 | 4.4 | 304.3 | 1.4 | 22.7 |
| 1.5 r.p.m.—rods added at one day after steep out | 308.5 | 4.2 | 304.3 | 1.4 | 22.7 |
| 1.5 r.p.m.—rods added at two days after steep out | 308.6 | 9.6 | 299.0 | 3.2 | 20.6 |
| 0.2 r.p.m. | 309.0 | 15.7 | 293.3 | 5.4 | 18.3 |
| 1.5 r.p.m. | 308.8 | 12.3 | 296.5 | 4.1 | 19.6 |
| 1.5 r.p.m.—rods added at steep out and removed 2 days after steep out | 309.1 | 8.6 | 300.5 | 2.9 | 21.2 |
| 1.5 r.p.m.—rods added at steep out and removed 3 days after steep out | 308.9 | 6.3 | 302.6 | 2.1 | 22.0 |
| 1.5 r.p.m.—rods added at steep out and removed 4 days after steep out | 309.0 | 4.0 | 304.0 | 1.6 | 22.6 |

The data in Table 1 indicate that the beginning of high impingement can be postponed until the first day of germination and can be discontinued after the fourth day of germination and the results will be about the same as obtained with a continuous high level of impact throughout the germination period.

EXAMPLE II

The procedure of Example I was followed using 350 g. samples of dry barley. The barley samples were steeped 7 hours, drained 15 hours, steeped 4 hours, and drained 2 hours, all at 55° F. The barley was then germinated 5 days at 62–64° F. with continuous subjection of the kernels to impact during germination from steep out as shown in foregoing Table 2. The green malt was kilned approximately 12 hours at 120° F., 4 hours at 140° F., 6 hours at 160° F., and 2 hours at 170° F. The equipment used for agitation was as in Example I.

Selected malts were analyzed by the "Methods of Analysis of the American Society of Brewing Chemists," 6th edition, American Society of Brewing Chemists, Madison, Wisconsin, 1958, and the results obtained are given in the following table:

TABLE 2

| Sample Number | Rotation [1] Description | Green Malt Moisture, Percent | Clean Malt, g. | Rootlets | | Percent Malt Increase |
|---|---|---|---|---|---|---|
| | | | | Grams | Percent | |
| 1 | A | 43.1 | 297.9 | 12.4 | 4.2 | 20.2 |
| 2 | C | 42.8 | 307.7 | 3.6 | 1.2 | 24.1 |
| 3 | A | 44.8 | 295.3 | 14.4 | 4.9 | 19.1 |
| 4 | B | 44.5 | 302.1 | 7.8 | 2.6 | 21.8 |
| 5 | C | 44.7 | 306.4 | 3.5 | 1.1 | 23.6 |
| 6 | A | 46.0 | 293.6 | 15.2 | 5.2 | 18.4 |
| 7 | B | 45.8 | 301.5 | 8.0 | 2.6 | 21.6 |
| 8 | C | 46.2 | 304.7 | 3.9 | 1.3 | 22.9 |

[1] A=0.2 r.p.m. rotation.  B=1.5 r.p.m.  C=1.5 r.p.m. and 2 rods.

TABLE 2A

| Sample Numbers | 3 | 4 | 5 | 6 | 7 | 8 |
|---|---|---|---|---|---|---|
| Growth Acrospire Length: | | | | | | |
| 0–¼ Length of Kernel | 1 | 0 | 0 | 1 | 0 | 1 |
| ¼–½ Length of Kernel | 1 | 1 | 1 | 1 | 1 | 1 |
| ½–¾ Length of Kernel | 12 | 4 | 2 | 4 | 1 | 1 |
| ¾–1 Length of Kernel | 85 | 91 | 95 | 93 | 89 | 74 |
| Over 1 Length of Kernel | 1 | 4 | 2 | 1 | 9 | 23 |
| Assortment: | | | | | | |
| On 7/64″ Mesh Screen | 9.6 | 19.9 | 30.0 | 11.1 | 26.9 | 38.3 |
| On 6/64″ Mesh Screen | 69.2 | 71.0 | 62.6 | 72.9 | 64.8 | 55.3 |
| On 5/64″ Mesh Screen | 21.0 | 8.9 | 7.1 | 15.7 | 8.0 | 6.0 |
| Thru 5/64″ Mesh Screen | 0.2 | 0.2 | 0.3 | 0.3 | 0.3 | 0.4 |
| Moisture (Percent) | 4.1 | 4.1 | 4.1 | 4.1 | 4.0 | 4.1 |
| Dry Extract (Percent) | 76.3 | 75.7 | 75.3 | 76.1 | 75.8 | 75.0 |
| Color (° L) | 1.80 | 1.83 | 1.81 | 2.04 | 1.90 | 1.84 |
| Diastatic Power | 129 | 116 | 111 | 120 | 119 | 111 |
| Alpha-amylase (20° Units) | 48.8 | 41.7 | 35.1 | 50.7 | 44.5 | 36.5 |
| Total Protein (Percent) | 11.07 | 10.60 | 9.91 | 10.98 | 10.23 | 11.39 |
| Soluble Protein (Percent) | 4.85 | 4.42 | 4.44 | 5.11 | 4.83 | 4.44 |
| Wort pH | 6.07 | 6.03 | 6.02 | 5.97 | 6.07 | 6.07 |

The effect of moisture on respiration loss is illustrated in Table 2, where at about 43% moisture the total recovery was 310.6 g., at about 44.5% moisture the recovery was 309.8 g., and at 46% moisture the recovery was 309.0 g. This indicates that additional enzymatic activity occurring at the high moisture level respired about one and one-half grams more carbohydrate than from the low moisture level malt.

Also, it should be noted in the same table that the amount of rootlet in relatively undisturbed malt increases with increasing malting moisture, from 12.4 g. at 43% moisture to 15.2 g. at 46% moisture, while the most vigorous degree of impingement gave comparable weight of rootlets from the three moisture levels of from 3.5 to 3.9 g. On a weight basis, the increase in yield obtained by increasing the degree of impingement from low to high amounted to more than 10 grams of cleaned malt from a normal recovery of 290 to 300 grams. This is an increase of greater than 3.3% in malt recovery.

EXAMPLE III 350 g. samples of Kindred barley were steeped and germinated at 63 to 65° F. for five days. Selected samples were germinated in bottles as in Example I with and without the presence of two ½" by 6" stainless steel rods to increase the impact effect on the sample. The samples were rotated at 1.5 revolutions per minute and the rotation was interrupted for differing length of time each day throughout the germination period. The following schedules were maintained for rotation induced impact during germination.

TABLE 3

| Schedule | Hours Rotated | Hours Not Rotated | Percent Time Under Rotation |
|---|---|---|---|
| A | 24 | 0 | 100 |
| B | 16 | 8 | 67 |
| C | 8 | 8 | 50 |
| D | 8 | 16 | 33 |
| E | 2 | 22 | 8 |

The malts were kilned as in Example I. The following Table 3A shows the recoveries of malt and rootlets for the various schedules.

TABLE 3A

| Schedule | Rods in Sample | Dry Substance, Grams | Clean Out, Grams | Clean Malt, Grams | Percent Clean Out | Percent Increase |
|---|---|---|---|---|---|---|
| A | No | 315.1 | 10.3 | 304.8 | 3.4 | 22.9 |
| A | Yes | 316.9 | 4.6 | 312.3 | 1.5 | 25.9 |
| A | Yes | 316.4 | 4.9 | 311.5 | 1.6 | 25.6 |
| A | Yes | 316.6 | 4.9 | 311.7 | 1.6 | 25.7 |
| B | No | 316.3 | 9.9 | 306.4 | 3.2 | 23.6 |
| B | Yes | 316.1 | 5.0 | 311.1 | 1.6 | 25.3 |
| B | Yes | 316.4 | 4.8 | 311.6 | 1.5 | 25.7 |
| B | Yes | 317.0 | 5.1 | 311.9 | 1.6 | 25.8 |
| C | No | 317.7 | 10.1 | 307.6 | 3.3 | 24.0 |
| C | Yes | 316.4 | 5.7 | 310.7 | 1.8 | 25.3 |
| C | Yes | 316.4 | 5.9 | 310.5 | 1.9 | 25.2 |
| C | Yes | 316.8 | 5.2 | 311.6 | 1.7 | 25.6 |
| D | No | 316.7 | 11.2 | 305.5 | 3.7 | 23.2 |
| D | Yes | 316.0 | 7.4 | 308.6 | 2.4 | 24.0 |
| D | Yes | 316.5 | 6.9 | 309.6 | 2.2 | 24.8 |
| D | Yes | 316.4 | 7.2 | 309.2 | 2.3 | 24.7 |
| E | No | 315.8 | 14.1 | 301.7 | 4.7 | 21.7 |
| E | Yes | 316.0 | 11.3 | 304.7 | 3.7 | 22.9 |
| E | Yes | 315.6 | 11.3 | 304.3 | 3.7 | 22.7 |
| E | Yes | 315.6 | 11.6 | 304.0 | 3.8 | 22.6 |

The points on FIGURE 2 of the attached drawing are the average of the three rod-containing samples prepared by each rotation schedule. As the time under impingement was increased from about 8 to 50 percent of the time, the increase in malt recovery was more than 2% but further increase in treatment time resulted in an additional increase of only about 0.3%.

The increase in malt recovery almost exactly balances the decrease in rootlet formation. This would indicate that those components that would normally be used in the formation of rootlet are being retained in the kernel and that the action of the forced kernel impact is to prevent the formation of rootlet rather than a removal of rootlet after it has been formed.

EXAMPLE IV

The effectiveness of impact in preventing rootlet formation, pilot germination (560 g. barley) of commercially steeped barley was compared with commercial germination (2500 bushels) of the same barley. The commercial germination was performed in a customary large compartment with the normal flow of humidified air through the perforated bottom and then through the malt. As customary, the malt was turned and mixed about every 8 hours with traveling vertical helices to prevent excessive rootlet formation and matting.

For the pilot study the apparatus of FIGURE 1 was used and a comparison was made between periodic turning at 0.2 r.p.m., continuous turning at 1.5 r.p.m., and continuous turning at 1.5 r.p.m. with 6 aluminum rods (½" by 6") included in the jar contents. It should be noted that the 0.2 r.p.m. periodic turning permitted excessive rootlet formation with a strong tendency to mat; the continuous 1.5 r.p.m. turning permitted controlled rootlet formation. Data follow for percent rootlets formed and recovered after kilning, for malt alpha-amylase activity, and for kernel modification:

TABLE 4

| Germination | Rotation | Rootlets, percent | Alpha-amylase units | Modification[1] coarse-fine difference |
|---|---|---|---|---|
| Commercial | Normal, periodic | 3.40 | 49 | 2.2 |
| Pilot | 0.2 r.p.m., periodic | 7.14 | 53 | 1.8 |
| Do | 1.5 r.p.m., continuous | 2.71 | 48 | 1.9 |
| Do | 1.5 r.p.m., continuous with rods. | 0.49 | 28 | 1.9 |

[1] The difference in wort extract obtained by comparing the mashing of a coarsely ground malt and the mashing of a finely ground malt is universally considered as a measure of kernel softening or "modification"—the lower the difference between the two values the better the modification.

It is apparent from Table 4 that simple more rapid turning of jars, even continuously at 1.5 r.p.m., permitted reduced rootlet production compared to normally stirred commercial malt, with similar alpha-amylase and modification values. However, the introduction of rods into the jar during rotation introduced an impingement process with the application of increased kinetic energy to the kernels whereby rootlet production of an entirely different order resulted. In fact, almost no rootlet production was visible, the 0.49% "rootlet" loss being composed substantially of flaked-off chaff resulting from processing of the malt through germination, kilning, and cleaning. The finished malt had adequate alpha-amylase activity, and modification even better than that achieved pilot-wise without the impingement process or by commercial processing.

EXAMPLE V

*Quantitative measurement of the impact required to prevent rootlet growth*

The data of Table 3B of Example III, show clearly that, for this barley, the rotation of the malting jars, without rods to activate the impingement of kernels on each other and on other solid surfaces achieved little, if any, reduction of rootlet growth with increasing percentage of rotation time over about 33%. However, use of the energy-inducing rods caused progressive reduction in rootlet loss with introduction of the rods up to some 67% of the germination time. An increase of the rod impingement action up to 100% of the germination time induced no further reduction in rootlet loss, with a plateau apparently being reached, in this instance, at about 1.5 to 1.6% "rootlet" loss. As in previous experiments, much of the "rootlet" loss with terminal impact control consisted of chaff and particles, other than rootlets, abraded off in process.

To determine the minimum amount of impact energy required to prevent rootlet growth, an energy level above which no further reduction in rootlet growth would occur, on an individual kernel, equipment was designed to subject the embryo ends of individual germinating barley kernels to a controlled and measured impact throughout germination. The series of impacts, or impingements, were of timed frequency and degree for a 5-day germination period, from just after steepout of the barley to just before kilning. An intermediate size of barley was used with an average individual kernel weight, after steeping to 45% moisture content, of 0.055 g.

The equipment is shown in FIG. 3 (top view of kernel holding plate) and FIG. 4 (side view of the complete apparatus). In the figures, the same numbers are used to identify the same parts or elements. A plate of clear plastic 30 which is 17 cm. x 18.4 cm. by 1.2 cm. thick is provided with twenty rows of slightly conical holes 31 with twenty holes to the row to give four hundred holes in all. The holes are smaller at the bottom than at the top and are of sufficient bore so each can contain a single kernel 32 of steeped, or germinating, barley without binding with the germ end 37 down. The hole is approximately 5 mm. dia. at the top and approximately 3 mm. dia. at the bottom. The germ end 37 of the kernels protrudes on the average about 1 mm. below the bottom of plate 30. FIG. 6 shows a kernel in one such hole in sectional view. A screen 53 is affixed on the upper surface of plate 30 to prevent the kernels from popping out of the holes upon impact with the lower, solid plate 34. Thus the kernels are not crushed against the lower plate 34 by falling kernel-holding plate 30 since the kernels are free within their containing holes.

Plastic plate 30 is hinged to solid plate 34, of the same size as plate 30, at point 35 in such a fashion that at the line of the first row of twenty holes 36 the embryo end of the germinating kernels, such as 37 in FIGS. 4 and 6, are in constant, and static, contact with the lower plate 34. To the upper plate 30 at point 33 is affixed arm 38. This arm is suspended by a hook 46 to an adjustable connecting rod 39 affixed to a horizontal arm 40. Arm 40 is hinged at point 41 to vertical support 42. Arm 40 is activated by motor driven cam 43 so as to give a vertical drop of plate 30 of 1 cm. at point 44, the edge farthest removed from the hinge 35.

The two plate device for holding the germinating kernels 30 and providing an unyielding impact surface on plate 34 is completely contained within a humidification chamber 45 such that the steeped-out kernels maintain 45% moisture and be under favorable conditions for growth and modification.

The distance of fall of each row of kernels could be measured, from 0 cm. at the hinge end, row 1 of FIGURE 3, to 0.840 cm. at the row farthest removed from the hinge end row 20. The number of impacts per minute was regulated by adjusting the velocity of rotation of the cam 45 of FIGURE 4, by means of a variable speed motor and belt drive (not shown). By measuring the speed of rotation of cam 43, the distance of drop of each row of kernels, the weight of each kernel, and the distance of travel of arm 40 as it dropped the 1 cm. distance on the cam it was possible to calculate the velocity of kernel fall and the energy generated by the kernel on impact with the lower plate 34 in gm. cm. per drop, per kernel.

Calculations required are as follows:

(1) $$T = \frac{at}{D\pi}$$

where:

$T$ = time required for the arm 40 of FIGURE 4 to drop 1 cm. on cam 43 and 1 cm. at point 44 for plate 30.
$a$ = arc measured by distance cam 43 travels during 1 cm. drop (measured by imprint on sensitive paper affixed to cam surface at area 47 of FIGURE 4).
$t$ = number of seconds required for one revolution of the cam 43, and
$D$ = diameter of the cam 43.

(2) $$A = \frac{2S}{T^2}$$

where:

$A$ = acceleration of falling kernel.
$S$ = space of drop (distance passed through by falling kernel).
$T$ = time required for drop (from Equation 1).

(3) $$V = \sqrt{2AS}$$

where:

$V$ = velocity of falling kernel.
$A$ = acceleration (from Equation 2).
$S$ = space of drop (distance of fall of kernel).

(4) $$KE = \frac{WV^2}{2g}$$

where:

$KE$ = kinetic energy of kernel impact against plate 34 of FIGURE 4, expressed in gm. cm.
$W$ = weight of barley kernel.
$V$ = velocity of fall (from Equation 3).
$g$ = gravity constant (980).

In the experiment of this example there were 108,000 drops during the 5-day germination period. For this experiment, with intermediate size kernels at 45% steepout moisture, the impact energy per kernel over the 5-day period was measured for section-rows 2 through 5, section-rows 6 through 9, section-rows 10 through 13, and section-rows 14 through 17. By visual inspection rootlet growth decreased progressively through the first 13 rows to reach essentially no growth at row 14 and continued absence of growth through rows 15, 16 and 17. At the end of the 5 days the kernels were removed from the apparatus, the rootlets carefully removed from each kernel by scissors, and the kernels and rootlets dried (kilned) and weighed. Alpha-amylase was determined on the kernels to evaluate malting response. The data obtained is in Table 5.

TABLE 5

| Rows | Average 5-day impact energy per kernel, gm. cm. | Rootlet[1] recovery, percent | Alpha-amylase activity | |
|---|---|---|---|---|
| | | | Units/kernel | Units/gram |
| 2–5 | 81.3 | 2.66 | 1.60 | 51 |
| 6–9 | 655 | 1.23 | 1.45 | 46 |
| 10–13 | 1,789 | 0.92 | 1.00 | 31 |
| 14–17 | 3,462 | 0.25 | 0.93 | 29 |

[1] It should be noted that the rootlet loss in this example is less for active growth, rows 2–5, than in some of the previous examples, due to the conditions of growth and the manner of rootlet removal.

The rootlet growth, and recovery, for each row in the 14–17 row area, by observation, was uniform and minimal, limited to incipient stubs that, while removed by the scissors and measured, could just as readily be characterized as not being due to true rootlet growth and elongation. Beginning then with an impact energy of 2793 gm. cm. per kernel per 5 days (row 14) through 4389 gm. cm. per kernel per 5 days (row 17) no further reduction in rootlets occurred and yet the alpha-amylase activity for the 4-row area showed a value sufficiently high, 29 units, to indicate malting had been accomplished without rootlet growth. Accordingly, it becomes obvious that an impact energy of somewhat over 2500 gm. cm. per kernel per 5 days may be required to stop rootlet growth completely with a barley individual kernel weight of approximately 0.055 gram.

The above deals with malting at 45% moisture. It is feasible to malt at lower moistures, say as low as 40%, and at higher moistures, say as high as 50%. At 50% moisture proportionally less drops per minute would be required for the same impact energy, and at 40% malting moisture, proportionally more. Further, very small berries may be malted, requiring many impact drops per minute, and very large berries requiring much fewer impingements per minute.

The ultimate objective of the invention, essential elimination of rootlets with retention of malt properties, was realized by a total cumulative physical impact or impingement energy of some 2800 gm. cm. per kernel. Very substantial reduction of rootlets, to approximately one-third of normal was achieved by about 1800 gm. cm. per kernel.

EXAMPLE VI

This experiment is a repeat of Example V using a similar intermediate size of Kindred barley, steeped to 45% moisture, placed in the apparatus described in FIGURES 3 and 4 and germinated under controlled temperature of 60–62° F. and high humidity for 5 days, before removal of the kernels from plate 10, excising of the rootlets, and drying for weight and analysis. In this case, however, instead of measuring average rootlet loss and enzyme activity for 4-row blocks of kernels, data were obtained for the kernels of individual rows 2 through 17 of plate 10.

The data are given below in tabular form and are presented graphically in FIGURE 5.

TABLE 6

| Row | Total 5-day impact energy per kernel, gm. cm. | Rootlet recovery, percent | Alpha-amylase activity | |
|---|---|---|---|---|
| | | | Units/kernel | Units/gm. |
| 2 | 11.3 | 2.92 | 1.32 | 43 |
| 3 | 54.9 | 2.87 | 1.08 | 35 |
| 4 | 119 | 2.81 | | |
| 5 | 225 | 1.94 | 1.56 | 47 |
| 6 | 361 | 1.82 | 1.43 | 43 |
| 7 | 556 | 1.52 | 1.52 | 45 |
| 8 | 791 | 1.49 | 1.40 | 44 |
| 9 | 1,063 | 1.12 | .97 | 29 |
| 10 | 1,353 | .88 | 1.06 | 30 |
| 11 | 1,740 | .95 | 1.26 | 42 |
| 12 | 2,014 | .75 | .93 | 29 |
| 13 | 2,395 | .75 | .85 | 26 |
| 14 | 2,793 | .86 | .92 | 31 |
| 15 | 3,318 | .25 | .95 | 31 |
| 16 | 3,807 | .35 | 1.06 | 33 |
| 17 | 4,389 | .35 | .90 | 29 |

Visual observation of the kernels at the end of 5 days' germination indicated that there was full rootlet growth in rows 2 to 4 with the least impact. Rootlet growth was progressively less with increased impact until, starting with row 15, there was essentially no growth other than the stubby, elongated embryo cap.

The alpha-amylase data of the table show that essentially there was no significant change in the activity from row 9 through row 17 even though rootlet growth was reduced to minimal levels in the row 15 to 17 area. The number of kernels, and weight of malt, was inadequate to permit quantitative measurement of kernel modification. However, while crushing the kernels for alpha-amylase extraction it was observed that they were not hard but soft, easy to crush, and well-modified through the kernels of row 17.

Figure 5:
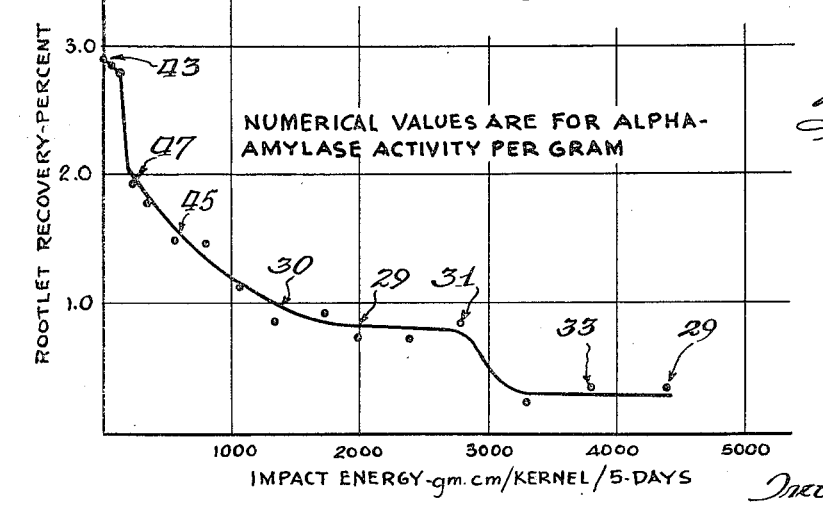
FIGURE 5 is a chart showing reduction in rootlet growth per applied impact energy.

Graphical presentation of the data, as given in FIGURE 5, is illustrative of the impact phenomenon. A slight stunting of the rootlets occurs in the 0 to 200 gm. cm. range. This is similar to commercial agitation. However, by increasing the impact energy to the range of 500 to 1500 gm. cm. the rootlet production can be progressively reduced to about one-half and down to about one-third of normal. Then, in the impact energy range of some 1500 to 2800 gm. cm., the rootlet loss reaches its first leveling off and holds quite constant with a malt alpha-amylase activity lower than normal but entirely acceptable.

With impact energy of above some 2800 gm. cm. per kernel another sharp drop in rootlet growth occurs, down to the minimal level of some 0.3%, to remain uniform through some 4500 gm. cm. This occurs without any drop in malt alpha-amylase activity.

It becomes obvious that two significant rootlet control phenomena are present, a reduction to about ⅓ of normal by impact energies in the range 1200 to 2800 gm. cm. and a further reduction to essential elimination with impact energies above some 2800 gm. gm. total impact per kernel throughout the malting period.

The evidence from previous examples indicates that this total impact or impingement energy does not need to be applied evenly and continuously throughout germination but may be intermittent, especially to achieve the two-thirds level of reduction in rootlet loss associated with the first phenomenon in impact malting.

Various changes and modifications of the invention can be made and, to the extent that such variations incorporate the spirit of this invention, they are intended to be included within the scope of the appended claims.

What is claimed is:
1. The process of increasing malt recovery which comprises subjecting steeped barley, commencing within one day after steep out, to enforce impact during at least 20% of the total germination time with the impact effect being applied at a rate and to an extent sufficient to materially suppress growth of rootlets without significantly altering by such impact other growth and modification processes that take place during the conversion of barley to malt.

2. The process of claim 1 in which the total impact time is not more than 75% of the total germination time.

3. The process of increasing malt recovery which comprises subjecting germinating steeped barley, commencing within one day after steep out, to enforced physical impact during at least 20% of the total germination time with the impact process being applied at a rate and to an extent sufficient to materially suppress growth of rootlets by at least 50% of the growth obtained with normal stirring and thereby increase the malt recovery by at least 2% without significantly altering, by such impact, other growth and modification processes that take place during the conversion of barley to malt.

4. The process of increasing malt recovery which comprises subjecting germinating steeped barley, commencing within one day after steep out, to enforced impact during at least 20% of the total germination time with the impact process being applied at a rate and to an extent sufficient to materially suppress growth of rootlets by at least 50% of the growth obtained with normal stirring and thereby increase the malt recovery by at least 2% without significantly altering, by such impact, other growth and modification processes that take place during the conversion of barley to malt.

5. The process of increasing malt recovery by at least 2% which comprises subjecting steeped barley, commencing within one day after steep out, to a physical impact of the kernels during at least 20% of the total germination time with the impact being applied at a rate and to an extent sufficient to inhibit rootlet formation without significantly altering, by such impact, other growth and modification processes that take place during the conversion of barley to malt, with the rootlet inhibition being not less than about 25% compared to the rootlet formation of malt produced under otherwise identical conditions but with agitation limited to prevent matting and localized excessive temperatures in the malting barley kernels without preventing rootlet growth.

6. The process of increasing malt recovery by at least 2% which comprises subjecting steeped barley, commencing within one day after steep out, to a physical impact which subjects the kernels to substantial impact pressure during about 20% to about 80% of the total germination time with the impact being applied at a rate and to an extent sufficient to inhibit rootlet formation without significantly altering, by such impact, other growth and modification processes that take place during the conversion of barley to malt, with the rootlet inhibition being not less than about 50% compared to the rootlet formation of malt produced under otherwise identical conditions but with mild agitation limited to prevent matting and formation of excessive temperatures in the malting barley kernels without preventing or interfering with rootlet growth.

7. The process of increasing malt recovery which comprises subjecting steeped barley, commencing within one day after steep out, to physical impact energy of at least 500 gm. cm. per kernel during the germination period with the impact energy being applied at a rate and to an extent sufficient to materially suppress growth of rootlets without significantly altering by such impact other growth and modification processes that take place during the conversion of barley to malt.

8. The process of claim 7 in which at least 1000 gm. cm. of physical impact energy is applied per kernel during the germination period.

9. The process of claim 7 in which from about 1500 to 5000 gm. cm. of physical impact energy is applied per kernel during the germination period.

10. The process of reducing the loss due to rootlets to not more than 2% in the malting of barley which comprises subjecting steeped barley, commencing within one day after steep out, to enforced impact during at least 20% of the total germination time with the physical impact energy being at least 500 gm. cm.

11. The process of claim 10 in which the rootlet loss is not more than 1%.

12. The process of increasing malt recovery which comprises subjecting steeped barley, commencing within one day after steep, to enforced impact during at least 20% of the total germination time to suppress rootlet growth, said impact force reducing any loss due to rootlet growth to less than 2%.

13. The process of claim 12 in which the impact is applied to reduce loss due to rootlet growth to less than about 1%.

References Cited in the file of this patent

UNITED STATES PATENTS

| | | |
|---|---|---|
| 1,117,323 | Chichester | Nov. 17, 1914 |
| 2,901,401 | Grimm et al. | Aug. 25, 1959 |
| 2,947,667 | Komm | Aug. 2, 1960 |
| 2,960,409 | Macey et al. | Nov. 15, 1960 |
| 3,014,847 | Kneen et al. | Dec. 26, 1961 |

UNITED STATES PATENT OFFICE

CERTIFICATE OF CORRECTION

Patent No. 3,174,909                              March 23, 1965

Lawrence D. Beckord et al.

It is hereby certified that error appears in the above numbered patent requiring correction and that the said Letters Patent should read as corrected below.

Column 2, line 17, after "modification" insert -- or --; column 7, line 27, for "length" read -- lengths --; column 9, line 54, for "17" read -- 17.5 --; column 10, line 20, for "45" read -- 43 --; column 12, line 73, for "enforce" read -- enforced --; column 14, line 34, after "steep" insert -- out --.

Signed and sealed this 27th day of July 1965.

(SEAL)
Attest:

ERNEST W. SWIDER                                          EDWARD J. BRENNER
Attesting Officer                                            Commissioner of Patents